United States Patent [19]

Vassiliou

[11] 4,120,608

[45] * Oct. 17, 1978

[54] HEAT-STABLE POLYMER COATING COMPOSITION WITH ANTIOXIDANT

[75] Inventor: Eustathios Vassiliou, Newark, Del.

[73] Assignee: E. I. Du Pont de Nemours and Company, Wilmington, Del.

[ * ] Notice: The portion of the term of this patent subsequent to Oct. 18, 1994, has been disclaimed.

[21] Appl. No.: 780,905

[22] Filed: Mar. 24, 1977

Related U.S. Application Data

[63] Continuation-in-part of Ser. No. 606,298, Aug. 22, 1975, abandoned, which is a continuation-in-part of Ser. No. 509,938, Sep. 27, 1974, abandoned, and a continuation-in-part of Ser. No. 552,870, Feb. 25, 1975, abandoned, which is a continuation-in-part of Ser. No. 509,938.

[51] Int. Cl.[2] .......................... B05D 3/02; B32B 3/10; B32B 27/00

[52] U.S. Cl. ............................... 428/187; 260/29.6 R; 260/37 R; 260/42.27; 260/900; 427/261; 427/302; 427/333; 427/340; 427/385 R; 427/387; 428/199; 428/204; 428/207; 428/422; 428/470; 428/913

[58] Field of Search ............... 428/422, 470, 420, 913, 428/199, 201, 207, 209, 203, 204, 187, 408, 411; 427/400, 302, 328, 399, 258, 261, 387, 340, 341, 356, 333, 385 R; 260/42.27, 29.6 R, 37 R, 900

[56] References Cited

U.S. PATENT DOCUMENTS

| | | | |
|---|---|---|---|
| 1,939,232 | 12/1933 | Sheppard et al. | 427/333 X |
| 2,681,324 | 6/1959 | Hochberg | 260/29.6 F |
| 2,752,637 | 7/1956 | Walker et al. | 260/42.27 X |
| 2,824,060 | 2/1958 | White | 260/900 X |
| 3,293,203 | 12/1966 | Paulus | 260/37 EP |
| 3,340,222 | 9/1967 | Fang | 260/900 X |
| 3,470,014 | 9/1969 | Koblitz et al. | 428/422 X |
| 3,473,949 | 10/1969 | Eldred et al. | 427/302 |
| 3,489,595 | 1/1970 | Brown | 428/422 |
| 3,922,457 | 11/1975 | Barnwell | 428/207 |
| 3,993,842 | 11/1976 | Hirsh et al. | 428/422 X |
| 4,054,704 | 10/1977 | Vassiliou | 428/422 X |
| 4,054,705 | 10/1977 | Vassiliou | 428/422 X |
| 4,064,303 | 12/1977 | Vassiliou | 428/411 X |

*Primary Examiner*—Harold Ansher
*Attorney, Agent, or Firm*—Cushman, Darby & Cushman

[57] ABSTRACT

A coating composition consisting essentially of certain heat-stable polymers, colorants, antioxidants, and liquid carrier useful for coating an article to produce a finish which is capable of maintaining its hue and having a decorative pattern produced within it is provided.

11 Claims, No Drawings

HEAT-STABLE POLYMER COATING COMPOSITION WITH ANTIOXIDANT

CROSS-REFERENCE TO RELATED APPLICATIONS

This application is a Continuation-in-Part of copending application Ser. No. 606,298, filed Aug. 22, 1975, which in turn is a Continuation-in-Part of application Ser. No. 509,938, filed Sept. 27, 1974, and a Continuation-in-Part of application Ser. No. 552,870, filed Feb. 25, 1975, which itself is a Continuation-in-Part of application Ser. No. 509,938, all now abandoned.

BACKGROUND OF THE INVENTION

1. Field of Invention

This invention relates to a coating composition consisting essentially of heat-stable polymer, colorant, antioxidant and liquid carrier.

2. Prior Art

Articles coated with heat-stable polymer compositions of various types have come into widespread use in recent years. Heat-stable polymer coated articles are useful for purposes requiring or aided by a heat-stable surface. Especially useful are heat-stable polymer coating compositions which provide lubricious surfaces. The uses of coated articles having lubricious surfaces range from bearings to ship bottoms and from iron soleplates to ice cube trays.

To achieve maximum consumer demand for an article consumer expectations must be met. One consumer expectation is to have a product which is pleasing to his or her aesthetic sense and which is capable of maintaining this pleasing effect throughout the product's useful life.

Carbon black is present in known dark colored heat-stable polymer coating compositions. A portion of the carbon black in these coating compositions is oxidized at temperatures attained during the manufacture and use of coated articles. As the carbon black is oxidized, the coatings' hue becomes lighter.

The composition of this invention provides a coating which maintains its hue at temperatures attained during manufacture and normal use of coated articles.

Additionally, the composition of this invention can undergo a process which produces a decorative pattern visible within coatings produced by the composition.

Decorative areas of the coating wear as well as non-decorative areas for the following reasons: The decorative pattern extends through the entire thickness of the coating; therefore, as the coating is worn thinner, the decorative pattern is still present. Concentration of heat-stable polymer is uniform throughout the coating, i.e., the decorative and non-decorative areas; therefore, the coating has uniform heat-stability throughout. Thickness of the coating is uniform, i.e., neither the decorative nor non-decorative areas are higher than the other, thereby not facilitating chipping of a higher area.

SUMMARY OF THE INVENTION

According to the present invention, there is provided a coating composition consisting essentially of certain heat-stable polymers, colorants, antioxidants, and liquid carrier.

This coating composition is capable of undergoing a process which renders a decorative pattern visible within a baked coating produced by the composition. The process consists essentially of applying the composition of this invention either as a subsequent coat over or directly under an oxidation catalyst composition which is arranged in a decorative pattern; wherein the oxidation catalyst or its decomposition or oxidation products diffuse into the coat and catalyze the oxidation of the colorant, thereby rendering, upon baking, the decorative pattern visible within the coating produced by the composition.

DESCRIPTION OF THE INVENTION

While any of the compounds described within this application can be utilized within the invention, when cookware is involved, Food and Drug Administration-approved compounds should be used.

A heat-stable polymer is a polymer which is not affected by temperatures above 300° C. which would decompose, oxidize, or otherwise adversely affect most organic compounds. Some examples of heat-stable polymers are silicones, polysulfides, polymerized parahydroxy benzoic acid, polysulfones, polyimides, polyamides, polysulfonates, polysulfonamides, H-resins (sold by Hercules Corporation), and fluorocarbons. One or more heat-stable polymers can be present in the composition of this invention.

The preferred heat-stable polymers are fluorocarbons because of their high temperature stability and release properties. The fluorocarbon polymers used are those of hydrocarbon monomers completely substituted with fluorine atoms or a combination of fluorine and chlorine atoms. Included in this group are perfluoroolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and copolymers of tetrafluoroethylene and perfluoroalkyl vinyl ethers. Mixtures of these can also be used.

The heat-stable polymer is ordinarily present in the composition of a concentration of 25% through 95%, preferably 70% through 90%, by weight of the total solids present in the composition.

Although a dry flour or powder of a heat-stable polymer can be used and a carrier provided separately, a polymer in the form of an aqueous surfactant-stabilized dispersion is preferred for its stability and because it is most easily obtained in that form. Dispersions of heat-stable polymers in organic liquids such as alcohols, ketones, aliphatic, or aromatic hydrocarbons, or mixtures of these, can also be used. In either case, the liquid generally serves as the carrier for the composition.

A colorant is any compound which changes color when oxidized. Carbon and carbonaceous residues are examples of colorants.

For the purpose of this invention, a reaction such as oxidation of carbon black to carbon dioxide, in which a solid is oxidized to a fugitive gas, the solid thereby vanishing from the composition, is considered a color change.

Carbon can be present in concentrations up to 40% or higher based on the weight of total solids of the composition, preferably in concentrations of 0.5–10%.

Carbonaceous residues are produced by decomposition or partial oxidation of organic compounds which includes organo-metallic compounds. Organic compounds are normally present in coating compositions to serve as dispersants, coalescing agents, viscosity builders, etc., or they can be added to serve as colorants.

Although absolute amounts of carbonaceous residues in the heat-stable polymer coating are usually extremely small, nevertheless, they give a definite coloration to a baked coating.

Examples of organic compounds which produce carbonaceous residues are polymers of ethylenically unsaturated monomers, which depolymerize, and whose depolymerization products vaporize, in the temperature range of from 150° C. below the fusion temperature to about the heat-stable polymer's decomposition temperature.

"Depolymerization" means degradation of a polymer to the point at which the degradation products are volatile at the temperatures encountered in curing the coat. The degradation products can be monomers, dimers, or oligomers.

"Vaporize" means volatilization of the degradation products and their evaporation from the film.

Usually the polymers of ethylenically unsaturated monomers contain one or more monoethylenically unsaturated acid units.

Representative of these ethylenically unsaturated monomers are alkyl acrylates and methacrylates having 1 to 8 carbon atoms in the alkyl group, styrene, 2-methyl styrene, vinyl toluene and glycidyl esters of 4 to 14 carbon atoms.

Representative of the monoethylenically unsaturated acids are acrylic acid, methacrylic acid, fumaric acid, itaconic acid, and maleic acid (or anhydride).

The polymer of an ethylenically unsaturated monomer which produces a carbonaceous residue can be present as a coalescing agent in the composition at a concentration of about 3% through 60% by weight of total heat-stable polymer and residue-producing polymer.

An antioxidant is any compound that opposes oxidation under fabrication baking conditions which are required for manufacture of heat-stable polymer-coated articles. The antioxidant can oppose oxidation either by itself or through its decomposition or oxidation products. All of these compounds should yield at least 0.01 parts by weight, based on solids and expressed as the acid, of the corresponding free acids or anhydrides when the compound is decomposed and/or oxidized during fabrication baking. The preferred yield range is 0.1 to 1 part by weight.

The preferred antioxidants are compounds containing phosphorus, sulfur, boron, or any combination of the above. The most common examples include the ortho-, meta-, pyro-acids; neutral and basic salts; esters and generally their organic derivatives, including organometallic derivatives.

More preferred antioxidants are phosphoric acid, at least completely neutralized with organic base such as triethanolamine or with ammonia, particularly decomposable phosphate salts containing ammonia or amines, 2-ethylhexyldiphenyl phosphate, magnesium glycerophosphate, calcium glycerophosphate, and iron glycerophosphate. Preferably the acid is sufficiently neutralized so that the coating composition has a pH of at least 8 to prevent coagulation of PTFE suspended in the composition.

The composition of this invention can be pigmented or unpigmented. Any pigment or combination of pigments ordinarily used in this sort of composition can be used. Typical of these pigments are titanium dioxide, aluminum oxide, silica, cobalt oxide, iron oxide, etc. The total amount of pigment ordinarily present is at a concentration of up to 40% by weight of the total solids in the composition.

The composition of this invention can contain mica particles, mica particles coated with pigment, and glass and metal flakes. These particles and flakes have an average longest dimension of 10 to 100 microns, preferably 15–50 microns, with no particles or flakes having a longest dimension of more than about 200 microns. Particle and flake size is measured optically against a standard.

The mica particles coated with pigment preferred for use are those described in U.S. Pat. No. 3,087,827, granted to Klenke and Stratton, and U.S. Pat. Nos. 3,087,828 and 3,087,829 granted to Linton. The disclosures of these patents are incorporated into this specification to describe the various coated micas and how they are prepared.

The mica particles described in these patents are coated with oxides or hydrous oxides of titanium, zirconium, aluminum, zinc, antimony, tin, iron, copper, nickel, cobalt, chromium, or vanadium. Titanium dioxide coated mica is preferred because of its availability. Mixtures of coated micas can also be used.

Representative of metal flake which can be used are aluminum flake, stainless steel flake, nickel flake, and bronze flake. Mixtures of flake can also be used.

The mica particles, coated mica particles, or glass and metal flake are ordinarily present in coating compositions at a concentration of about 0.2–20% by weight of total solids.

The composition can also contain such conventional additives as flow control agents, surfactants, plasticizers, coalescing agents, etc., as seem necessary or desirable. These additives are added for reasons, in ways and in amounts known to those skilled in the art.

The amount of total solids in the composition will be governed by the substrate to which the composition is to be applied, method of application, curing procedure, and like factors. Ordinarily, the composition will contain 10% through 80% by weight of total solids, but preferably 30–50%.

The composition of this invention is capable of undergoing a process which renders a decorative pattern visible within a baked coating produced from the composition. The decorative pattern has discrete areas which are darker or lighter or a different color than other areas of the pattern. The pattern can have a predetermined geometry, or it can be a random pattern; however, it does not have a uniform, undifferentiated appearance. By a decorative pattern is meant any discrete image, picture, design, configuration, or illustration which can be formed by any conventional method of applying ink.

The process for producing decorative patterns within a baked coating consists essentially of applying the composition of this invention either as a subsequent coat over or directly under an oxidation catalyst composition which is arranged in a decorative pattern. The oxidation catalyst or its decomposition or oxidation products diffuse into the composition and catalyze oxidation of the colorant thereby rendering, upon baking, the decorative pattern visible within the coating produced by the composition.

In other words, included in the process are various sequences of applying the compositions to the substrate; for example:

(1) first the oxidation catalyst composition, and then the coating composition;

(2) first the coating composition and then the oxidation catalyst composition;

(3) first a primer composition, then the oxidation catalyst composition, and then the coating composition;

(4) first the oxidation catalyst composition, then a primer composition, and then the coating composition; or (5) first a primer composition, then the coating composition, and then the oxidation catalyst composition.

The baking temperature range of the process is dependent mainly upon which heat-stable polymer composition is utilized. The process of this invention is utilizable upon any conventionally used substrate. The substrate may be coated with a primer prior to the application of the oxidation catalyst composition. The substrate is preferably pretreated prior to the application of any coating composition. Pre-treatment methods include flame-spraying, frit-coating, grit-blasting and acid- or alkali-treating. A metal substrate is preferably pre-treated by grit-blasting, by flame-spraying of a metal or a metal oxide, or by fritcoating, although the compositions can be applied successfully to phosphated, chromated or untreated metal. A glass substrate is preferably grit-blasted or frit-coated.

A primer composition, if desired, can be applied either under or over the oxidation catalyst composition. The primer composition can be applied in any of the customary ways, which include spraying, roller coating, dipping, and doctor blading. Spraying is generally the method of choice.

The primer composition can be any conventionally used primer coating. An example is the silica-perfluorocarbon primer disclosed by E. J. Welch in U.S. patent application Ser. No. 405,978, filed Oct. 12, 1973 now abandoned.

The coating composition of this invention is applied to a thickness of about 0.5–5 mils (dry) and baked for a time and at a temperature sufficient to fuse or cure the heat-stable polymer being used.

An oxidation catalyst composition is any composition which contains a compound which promotes oxidation under the baking conditions required for fabrication of coated articles. The oxidation catalyst can promote oxidation either itself or through its decomposition or oxidation products. The oxidation catalyst causes the decorative pattern to be rendered visible, upon baking, by combining with the antioxidant of the composition to form a compound which does not function as an antioxidant at the fabrication baking temperatures of the coated article and/or by overwhelming effects of the antioxidant of the coating composition.

Included in this class are compounds of one or more of the metals:

| | | |
|---|---|---|
| Chromium | Cerium | Lithium |
| Cobalt | Thorium | Sodium |
| Iron | Manganese | Potassium |
| Nickel | Bismuth | Lead |
| | Cadmium | or |
| | | Molybdenum |

which compounds decompose in the temperature range of about 100°–500° C. to give at least 0.2%, by weight of the metal in the compound, of an oxide or hydroxide.

Enough of such a metal or compound should be present to give at least about 0.005 parts of metal per hundred parts of the heat-stable polymer.

Preferred compounds are oxides or hydroxides of lithium, sodium or potassium, and those compounds produced by reaction of a metal from the following list (1) with an acid to form a salt compound of list (2).

| | |
|---|---|
| (1) Metals | |
| Bismuth | Manganese |
| Cerium | Lithium |
| Cobalt | Potassium |
| Iron | Sodium |
| (2) Salts | |
| Acetate | Octoate |
| Caprate | Oleate |
| Caprylate | Palmitate |
| Isodeconoate | Ricinoleate |
| Linoleate | Soyate |
| Naphthenate | Stearate |
| Nitrate | Tallate |

More preferred oxidation catalyst compounds are:

Cobalt octoate
Cerium octoate
Manganese octoate
Iron octoate
Bismuth octoate

Most preferred as an oxidation catalyst for general purposes of the invention is a combination of cobalt and cerium octoates.

The oxidation catalyst composition can be applied by any conventional method of applying ink. The preferred methods are to apply the oxidation catalyst composition by "Intaglio" offset, e.g., using a Tampoprint® machine sold by Dependable Machine Co., Inc., or silk screening.

The oxidation catalyst is dissolved or dispersed in suitable carriers for the particular oxidation catalyst.

The percentage range by weight of metal content to the total weight of oxidation catalyst plus carrier depends on the oxidation catalyst's formulation and application method. The preferred percentage range is 1–20%, although lower than 1% and higher than 20% concentration can also be used depending on the type of antioxidant, amount of antioxidant, coating method and condition, baking methods and condition, as well as characteristics of the oxidation catalyst.

The oxidation catalyst composition formulation can include viscosity builders or thickeners, wetting agents, pigments, decomposable or heat-stable resins and polymers, neutralizers, liquid carriers, and other adjuncts.

Polytetrafluoroethylene and other heat-stable polymers are examples of viscosity builders or thickeners. Preferably the same heat-stable polymer utilized in the coating composition is utilized as the viscosity builder or thickener.

Examples of pigment are carbon black, iron oxide, cobalt oxide and titanium dioxide. When pigment is present in the oxidation catalyst composition, at least an equal amount, preferably three to ten times as much, of heat-stable polymer will, preferably, also be present.

The process and composition of this invention are useful for any article that may use a heat-stable polymer surface; examples are cookware, especially frying pans, bearings, valves, wire, metal foil, boilers, pipes, ship bottoms, oven liners, iron soleplates, waffle irons, ice cube trays, snow shovels, saws, files and drills, hoppers and other industrial containers and molds.

The following examples are representative of the invention. All parts and percentages are on a weight basis unless otherwise stated.

EXAMPLE 1

Prepare coating compositions as follows:

(a) Add slowly 110.66 parts by weight of deionized water to 657 parts by weight of an aqueous dispersion of polytetrafluoroethylene containing 6% by weight isooctylphenoxypolyethoxyethanol.

(b) Add slowly, with stirring, to the product of (a) 115.75 parts by weight of an aqueous dispersion, 40% solids of a methyl methacrylate/ethyl acrylate/methacrylic acid terpolymer having monomer weight ratios of 39/57/4.

(c) Prepare a black mill base by mixing and then pebble milling:

| | PARTS BY WEIGHT |
|---|---|
| Carbon | 20 |
| Aluminosilicate pigment | 10 |
| Sodium polynaphthalene sulfonate | 3 |
| Water (deionized) | 67 |

(d) Prepare a titanium dioxide dispersion by mixing and then pebble milling:

| | PARTS BY WEIGHT |
|---|---|
| Titanium dioxide | 45 |
| Water (deionized) | 54.5 |
| Sodium polynaphthalene sulfonate | .5 |

(e) Prepare a cobalt oxide dispersion by mixing and then pebble milling:

| | PARTS BY WEIGHT |
|---|---|
| Cobalt oxide | 45 |
| Water (deionized) | 55 |

(f) Add slowly, with stirring and in order, to the product of step (b):

| | PARTS BY WEIGHT |
|---|---|
| Black mill base | 10.72 |
| Titanium dioxide dispersion | 81.21 |
| Cobalt oxide dispersion | 9.74 |
| (g) Prepare a solvent-surfactant by mixing: | |

(g) Prepare a solvent-surfactant by mixing:

| | PARTS BY WEIGHT |
|---|---|
| Triethanolamine | 25.88 |
| Toluene | 46.36 |
| Butyl carbitol | 15.63 |
| Oleic acid | 12.13 |

(h) Add slowly, with stirring, 109.83 parts by weight of the solvent-surfactant of (g) to the product of (f).

(i) Prepare a composition consisting of 1 part by weight of phosphoric acid (85%) per 5 parts by weight of triethanolamine. This is sufficient triethanolamine to neutralize completely the phosphoric acid. The thus neutralized phosphoric acid is sometimes referred to herein as the "phosphoric acid composition."

(j) Add a sufficient amount of the phosphoric acid composition of (i) to a portion of the product of (h) to produce a coating composition containing 1% phosphoric acid composition.

(k) Add a sufficient amount of the phosphoric acid composition of (i) to a portion of the product of (h) to produce a coating composition containing 2% phosphoric acid composition.

Prepare 12 aluminum panels by frit-coating and priming according to the directions of Example 3 of U.S. application Ser. No. 405,798, filed October 12, 1973

Spray the coating composition not containing phosphoric acid, i.e., the product of (g), to a thickness of 1 mil (dry) on four of the panels and dry in air.

Spray the coating composition containing 1% phosphoric acid composition, i.e., the product of (j), to a thickness of 1 mil (dry) on four other panels and dry in air.

Spray the coating composition containing 2% phosphoric acid composition, i.e., the product of (k), to a thickness of 1 mil (dry) on the four remaining panels and dry in air.

Place all 12 panels into an oven at 430° C. When the temperature of the panels reaches 430° C., remove one of each differently coated panel. After intervals of 5 minutes, 15 minutes, and 30 minutes of baking at 430° C., remove another of each differently coated panel.

Measure the amount of reflected light of each panel using a reflectometer. The reflectometer readings are as follows:

| Panels Coated With Composition Containing | 0 Min. | 5 Min. | 15 Min. | 30 Min. |
|---|---|---|---|---|
| No phosphoric acid | 20 | 28 | 48 | 47 |
| 1% of phosphoric acid composition | 20 | 20 | 22 | 27 |
| 2% of phosphoric acid composition | 20 | 20 | 21 | 21 |

Higher numbers indicate more reflected light which signifies lighter color or less carbon present in the coating.

This example shows that coatings produced by compositions containing phosphoric acid are significantly more color-fast than coatings produced by compositions not containing phosphoric acid.

EXAMPLE 2

Prepare coating compositions as follows:

(a) Add 9.46 parts by weight of deionized water to 67.53 parts by weight of an aqueous dispersion of polytetrafluoroethylene, 60% solids containing 6% by weight of isooctylphenoxypolyethoxyethanol.

(b) Add slowly, with stirring, to the product of (a) 11.98 parts by weight of an aqueous dispersion, 40% solids of a methyl methacrylate/ethyl acrylate/methacrylic acid terpolymer having monomer weight ratios of 39/57/4.

(c) Prepare a black mill base by mixing and pebble milling:

| | PARTS BY WEIGHT |
|---|---|
| Triethanolamine | 7.00 |
| Oleic acid | 3.28 |
| Butyl carbitol | 4.23 |
| Toluene | 12.56 |
| Deionized water | 59.39 |
| Channel black | 15.69 |

-continued

| | PARTS BY WEIGHT |
|---|---|
| Aluminosilicate pigment | 7.84 |

(d) Prepare a red mill base by mixing and ball milling overnight:

| | PARTS BY WEIGHT |
|---|---|
| Deionized water | 33.75 |
| Oleic acid | 3.33 |
| Triethanolamine | 6.67 |
| Toluene | 8.84 |
| butyl carbitol | 2.84 |
| Red iron oxide | 45.00 |

(e) Add, slowly and with stirring, 4.33 parts by weight of the black mill base and 3.58 parts by weight of the red mill base to the product of (b).

(f) Add slowly, with stirring, 3.12 parts by weight of a solvent-surfactant mixture, prepared as in (g) of Example 1, to the product of (e).

(g) Add sufficient amounts of a phosphoric acid composition, prepared as in (i) of Example 1, to a portion of the product of (f) to produce a coating composition containing 4% by weight of the phosphoric acid composition.

Prepare six aluminum panels by frit-coating and priming as in Example 1.

Spray the composition not containing any phosphoric acid composition, i.e., the product of (f), to a thickness of 1 mil (dry) on three of the panels and dry in air.

Spray the composition containing 4% of the phosphoric acid composition, i.e., the product of (g), to a thickness of 1 mil (dry) on the remaining three panels and dry in air.

Place all six panels into an oven at 430° C. When the temperature of the panels reaches 430° C., remove one of each differently coated panel. After 5 minutes at 430° C., remove the second of each differently coated panel and after 15 minutes remove the last of each differently coated panel.

Measure the amount of reflected light of each panel using a reflectometer. The reflectometer readings are as follows:

| Panels Coated With Composition Containing | 0 Min. | 5 Min. | 15 Min. |
|---|---|---|---|
| No phosphoric acid | 33 | 38 | 54 |
| 4% of phosphoric acid composition | 32 | 31 | 31 |

Higher numbers indicate more reflected light which signifies lighter color or less carbon present in the coating.

This example shows that coatings produced by a composition containing phosphoric acid are significantly more colorfast than coatings produced by compositions not containing phosphoric acid.

EXAMPLE 3

Frit-coat and prime an aluminum panel as in Example 1.

Prepare an oxidation catalyst composition consisting of:

60% by weight cobalt octoate in mineral spirits (12% metal content by weight)

40% by weight oleic acid.

Stamp the oxidation catalyst composition in a decorative pattern upon the aluminum panel.

Spray the coating composition of Example 1 which contains 2% of the phosphoric acid composition onto the panel to a thickness of 0.7-mil (dry). Dry the panels in air.

Bake the air-dried panel at 430° C. for 5 minutes.

The area of the coating over the oxidation catalyst composition becomes considerably lighter while the other areas of the coating maintain their hue thereby producing a light decorative pattern upon a gray background.

EXAMPLE 4

Frit-coat and prime three aluminum panels as in Example 1.

Prepare three oxidation catalyst compositions as follows:

1. Cerium octoate in 2-ethyl hexanoic acid (12% metal content by weight);
2. Manganese octoate in mineral spirits (6.0% metal content by weight);
3. Bismuth octoate in 2-ethyl hexanoic acid (8.5% metal content by weight).

Stamp one of the oxidation catalyst compositions in a decorative pattern upon each of the three aluminum panels.

Spray the coating composition of Example 3 onto each panel to a thickness of 0.7-mil (dry).

Dry the panels in air.

Bake the air-dried panel at 430° C. for 5 minutes.

The areas of the coatings over the oxidation catalyst compositions become considerably lighter while the other areas of the coatings maintain their hue thereby producing a light decorative pattern upon a gray background.

EXAMPLE 5

Prepare the coating composition of Example 1 (k).

To 100 parts of the coating composition add 3.6 parts of $TiO_2$ coated mica particles (Afflair ® NF-152-D sold by E. I. du Pont de Nemours and Company).

Prepare a primer composition by mixing together the following:

| | PARTS BY WEIGHT |
|---|---|
| Deionized water | 154.11 |
| Aqueous dispersion of PTFE, 60% by weight solids | 1105.03 |
| Colloidal silica sol ("Ludox-AM" sold by E. I. du Pont de Nemours and Company) | 761.56 |
| Toluene | 112.25 |
| Diethylene glycol monobutyl ether | 26.50 |
| Silicone (60% by weight solids in xylene) | 67.20 |

| | PARTS BY WEIGHT |
|---|---|
| Triethanolamine | 22.65 |
| Oleic acid | 11.32 |
| White mill base | 166.50 |
| 45% $TiO_2$ | |
| 54.5% Deionized water | |
| 0.5% sodium polynaphthanene sulfonate | |

Prepare four aluminum panels by frit-coating as in Example 1.

Spray the primer composition to a thickness of 0.3-mil (dry) and dry in air.

Prepare the following four oxidation catalyst compositions:

(1)

60% by weight cobalt octoate in mineral spirits (12% metal content by weight)
40% by weight oleic acid (2)

Cerium octoate in 2-ethylhexanoic acid (12% metal content by weight)

(3)

Manganese octoate in mineral spirits (6.0% metal content by weight)

(4)

1.5 parts cerium octoate in 2-ethylhexanoic acid (12% metal content by weight)
0.5 part -
60% by weight cobalt octoate in mineral spirits (12% metal content by weight)
40% by weight oleic acid Stamp one of the four different oxidation catalyst compositions in a decorative pattern upon each of the four aluminum panels.

Spray the coating composition onto each panel to a thickness of 0.7-mil (dry) and dry in air.

Bake the air-dried panels at 430° C. for 5 minutes.

The area of the coatings over the oxidation catalyst composition becomes lighter while the other areas of the coatings maintain their hue, thereby producing a light decorative pattern upon a gray background.

What is claimed is:

1. A process for producing decorative patterns within a baked coating composition on a substrate, said coating composition consisting essentially of (a) heat-stable polymer stable at temperatures above 300° C.,
(b) colorant,
(c) antioxidant, and
(d) liquid carrier;

said process consisting essentially of applying the composition either as a subsequent coat over or directly under an oxidation catalyst composition which is arranged in a decorative pattern on a substrate, and then baking the coating; wherein said oxidation catalyst or its decomposition products diffuse into the coating and catalyze oxidation of the colorant, thereby rendering, upon baking, the decorative pattern visible within the heat-stable polymer coating.

2. The process of claim 1 wherein the coating composition is applied over the oxidation catalyst composition.

3. The process of claim 1 wherein the coating composition is applied under the oxidation catalyst composition.

4. The process of claim 1 wherein the antioxidant composition contains a compound containing phosphorus, sulfur, boron, or a combination thereof.

5. The process of claim 1 wherein the antioxidant composition is antioxidant which is phosphoric acid at least completely neutralized with organic base or ammonia.

6. The process of claim 1 wherein the oxidation catalyst composition further consists of viscosity builder or thickener, wetting agent, pigment, decomposable polymer, heat-stable polymer, neutralizer, liquid carrier, or mixtures of the above.

7. The process of claim 1 wherein the oxidation catalyst composition contains a compound or mixture of compounds of one or more of the metals:

| | | |
|---|---|---|
| Chromium | Cerium | Lithium |
| Cobalt | Thorium | Sodium |
| Iron | Manganese | Potassium |
| Nickel | Bismuth | Lead |
| | Cadmium | or |
| | | Molybdenum |

which compound decomposes in the temperature range of about 100°-500° C. to give at least 0.2%, by weight of the metal in the compound, of an oxide or hydroxide, in adequate quantity so as to provide at least about 0.005 parts of metal per hundred parts of heat-stable polymer.

8. The process of claim 7 wherein the oxidation catalyst composition is a combination of cobalt and cerium octoates.

9. The process of claim 1 wherein the oxidation catalyst is one or more compounds selected from oxides and hydroxides of lithium, sodium and potassium, and those compounds produced by reaction of a metal from list (1) with an acid to form a salt compound of list (2):

| | |
|---|---|
| (1) Metals | |
| Cobalt | Bismuth |
| Cerium | Lithium |
| Manganese | Potassium |
| Iron | Sodium |
| (2) Salts | |
| Acetate | Octoate |
| Caprate | Oleate |
| Caprylate | Palmitate |
| Isodecanoate | Ricinoleate |
| Linoleate | Soyate |
| Naphthenate | Stearate |
| Nitrate | Tallate |

10. The process of claim 4 wherein the oxidation catalyst composition contains
Cobalt octoate
Cerium octoate
Manganese octoate
Iron octoate
Bismuth octoate
Nickel octoate
Lead octoate or mixtures of the above.

11. An article bearing a baked coating produced by the process of claim 1.

* * * * *